United States Patent [19]

Van Zee et al.

[11] Patent Number: 5,203,153
[45] Date of Patent: Apr. 20, 1993

[54] LIFT APPARATUS FOR A GROUND VEHICLE

[75] Inventors: Daryl W. Van Zee; Scott A. Rempe, both of Pella, Iowa

[73] Assignee: Vermeer Manufacturing Company, Pella, Iowa

[21] Appl. No.: 706,405

[22] Filed: May 28, 1991

[51] Int. Cl.⁵ ............................................ A01D 39/00
[52] U.S. Cl. ...................................... 56/341; 56/432; 100/88
[58] Field of Search .......................... 56/341, 432, 364; 100/88, 89

[56] References Cited

U.S. PATENT DOCUMENTS

| | | | |
|---|---|---|---|
| 3,063,226 | 11/1962 | Pfauser | 56/17.1 X |
| 3,646,735 | 3/1972 | Fritz | 56/14.7 |
| 4,172,354 | 10/1979 | Vermeer et al. | 56/341 |
| 4,669,257 | 6/1987 | Rossato et al. | 56/341 |

*Primary Examiner*—Terry Lee Melius
*Attorney, Agent, or Firm*—Kent A. Herink; Brian J. Laurenzo

[57] ABSTRACT

A lift apparatus for raising and lowering a ground vehicle. A pair of transversely opposite frame members are interconnected at their lower end portions by a transversely extended crank axle. A pair of four-bar parallelogram linkages are located on either side of the vehicle and each of which includes a lever plate which supports a ground wheel of the vehicle. An upper link pivotally interconnects the lever plate to the associated frame member. A lower link is pivotally attached at one end to the lever plate and is secured at its other end to the crank axle, thereby forming a crank arm. A hydraulic cylinder is interconnected between each of the lever plates and the associated frame member. Extension and retraction of the cylinders raises and lowers the vehicle.

14 Claims, 4 Drawing Sheets

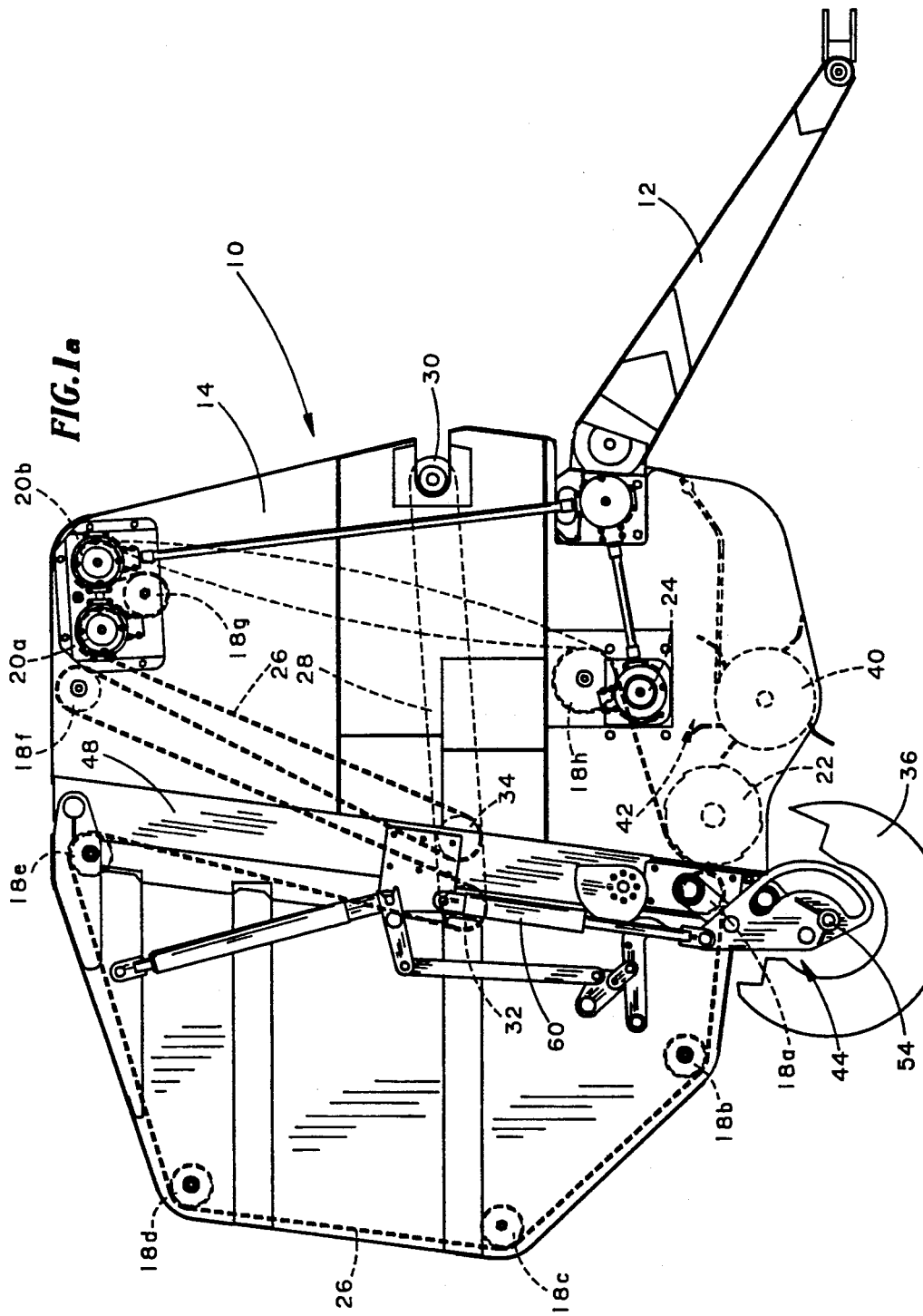

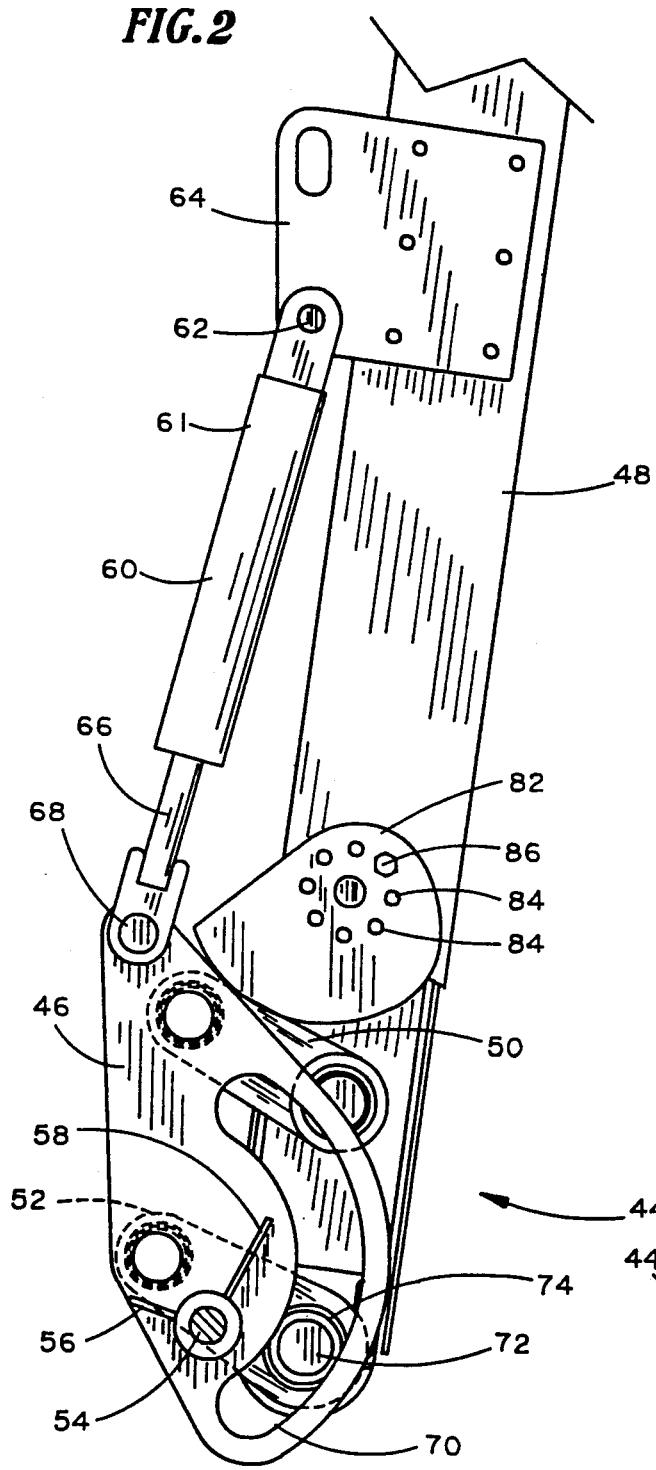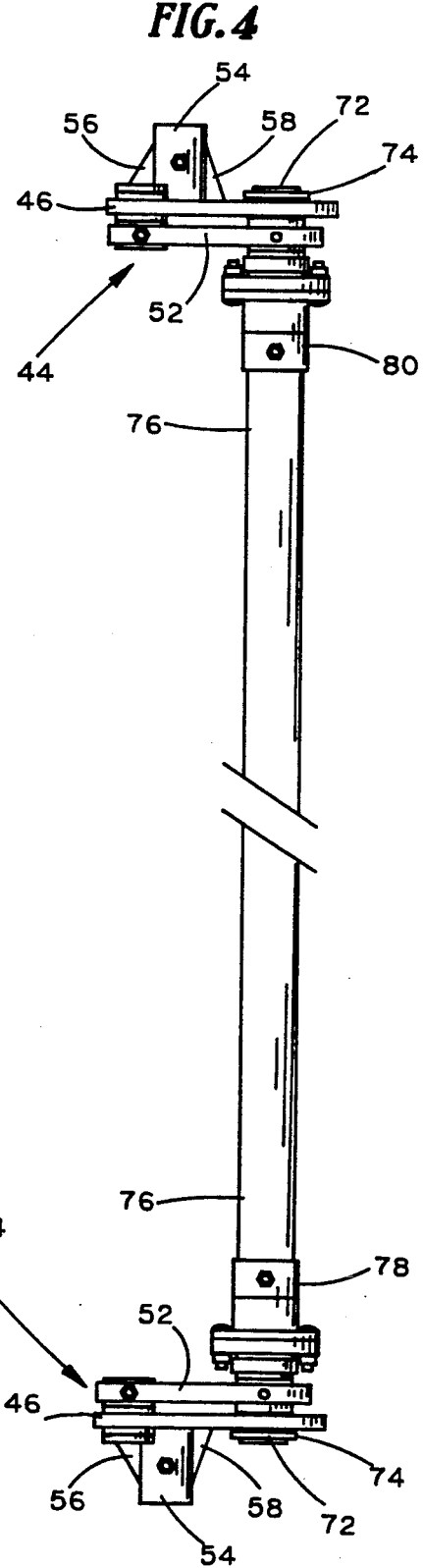

LIFT APPARATUS FOR A GROUND VEHICLE

BACKGROUND OF THE INVENTION

The invention relates generally to ground vehicles and, more specifically, to a lift apparatus for ground vehicles which utilizes a four-bar linkage.

Land vehicles are, of course, in very common usage. Certain or such vehicles, particularly tractor-drawn agricultural implements, must be height-adjustable relative to the ground so that they can function effectively and efficiently. By way of specific example, balers of crop material must have sufficient ground clearance to allow transport through the crop field and yet also have a crop pick-up mechanism that is adjustable to operate adjacent the surface of the ground so as to engage and pick up the crop material to be baled.

In existing balers, such as are described in U.S. Pat. No. 4,172,354, the height of the main body of the baler above the ground is fixed and the crop pick-up mechanism is raised and lowered relative to the rest of the baler to the operating or transport position. The above-identified baler is of the "open throat" design which includes a bale starting chamber the entrance to which is defined by the crop pick-up mechanism and a starter roller. The size of this opening changes with adjustments in the position of the crop pick-up mechanism relative to the baler. Because the operation of the bale starting chamber is sensitive to the size of the opening to the chamber, movement of the crop pick-up mechanism can, under certain circumstances, adversely affect the performance of the baler. There is a need, accordingly, for a baler with a lift apparatus whereby an operator can quickly and easily adjust the height of the baler and the associated crop pick-up mechanism without changing the size of the open throat entrance to the bale starting chamber.

SUMMARY OF THE INVENTION

The invention consists of a four-bar linkage apparatus for adjusting the height of a ground vehicle. In the preferred embodiment, a pair of wheels of a tractor-drawn agricultural implement are mounted on spindles which extend outwardly from a pair of transversely opposite lever plates. An upper and a lower link pivotally interconnect each of the lever plates to an associated frame member of the ground vehicle. The lower link forms a crank arm for a transversely extended crank axle, the end portions of which are pivotally received in the frame members. An hydraulic cylinder is connected between the lever plates and the associated one of the frame members. Extension and retraction of the hydraulic cylinders will move the lever plates relative to the frame members and thereby adjust the height of the ground vehicle.

The lever plates may include an arcuate opening in which travels a pin that extends from the end portions of the crank axle. A pair of bosses are supported on the support pin on either side of each of the lever plates. The bosses handle the moment created in the four-bar linkage by loading of the wheels which are offset from the plane of movement of the four-bar linkage.

An object of the invention is to provide a four-bar apparatus for raising and lowering a main frame structure of a ground vehicle.

Another object of the invention is to provide a four-bar linkage for adjusting the height of a land vehicle between an upper, transport position and a plurality of lower, operating positions.

A further object of the invention is to provide a four-bar linkage for adjusting the height of a land vehicle wherein a load point of the linkage is located outside of the plane of movement of the four-bar linkage.

A further object of the invention is to provide an additional support pin to a four-bar linkage to handle a moment induced on the linkage by a load located outside the plane of movement of the four-bar linkage.

Still another object of the invention is to provide a lift apparatus for a land vehicle which is of a compact design and is economical to manufacture.

These and other objects of the invention will become apparent upon a review of the disclosure of the invention contained herein.

BRIEF DESCRIPTION OF THE DRAWINGS

FIGS. 1a and 1b are elevational views of a baler which embodies the present invention showing the baler in an extreme raised position in FIG. 1a and in an extreme lowered position in FIG. 1b;

FIG. 2 is a side elevational view of the four-bar linkage of the present invention;

FIG. 4 is a top view of the four-bar linkage showing the crank axle that extends transversely of the baler.

DETAILED DESCRIPTION OF A PREFERRED EMBODIMENT

Figure 1B:
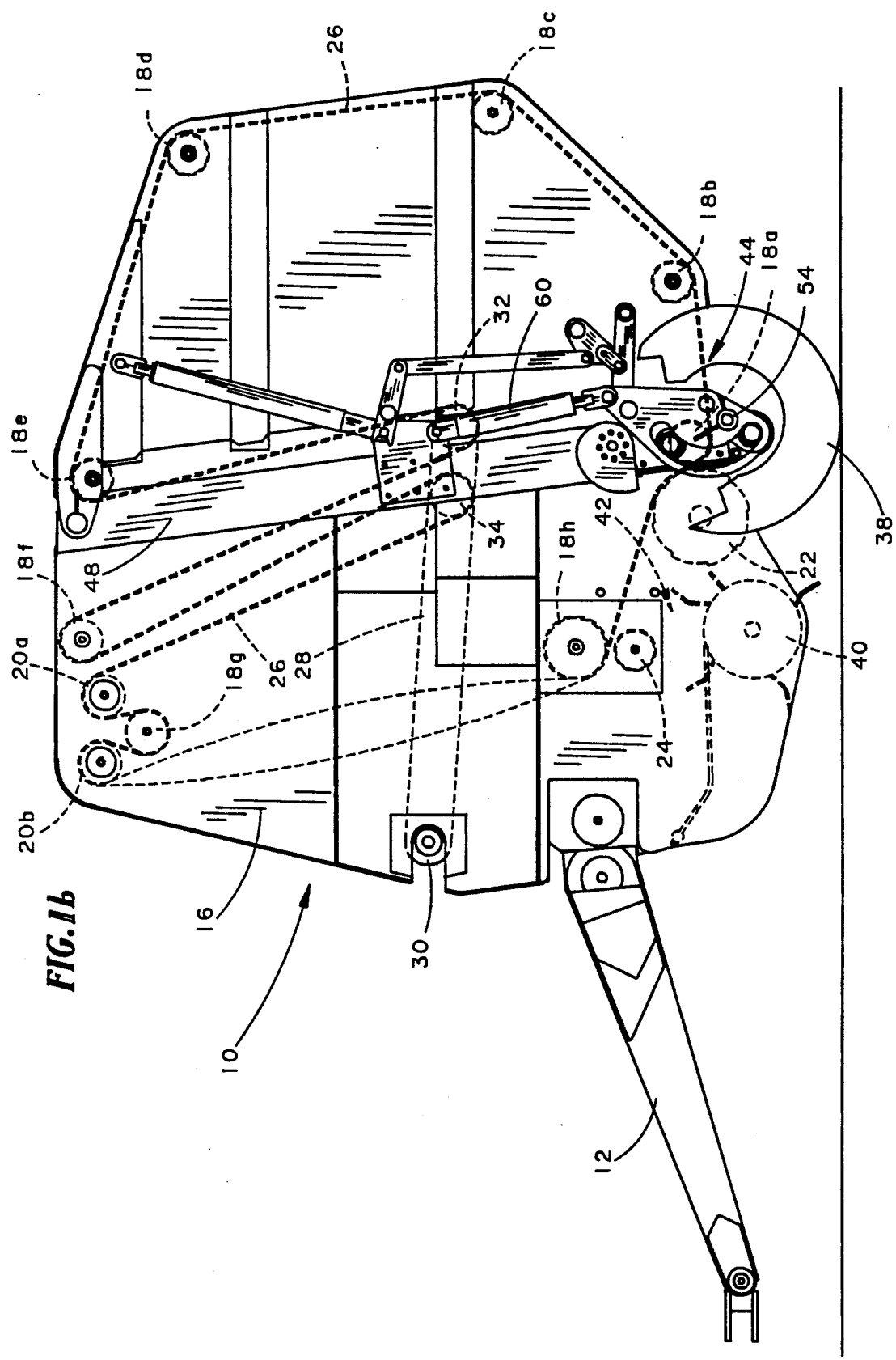

Illustrated in FIGS. 1a and 1b, generally at 10, is a tractor drawn, ground supported baler for forming large cylindrical bales of crop material. A draw tongue 12 extends forwardly of the baler 10 for attachment to a tractor (not shown) or similar motive means. The baler 10 has a pair of transversely spaced, opposite side walls, right side wall 14 (FIG. 1a) and left side wall 16 (FIG. 1b). Extended between the side walls 14 and 16 are a plurality of transverse shafts or rollers 18a–h, driven belt rollers 20a and 20b, drum 22, and a starter roller 24. A plurality of endless belts 26 are trained about the idler belt rollers 18 and driven belt rollers 20. A belt tension arm 28 is pivotally attached at 30 to both side walls 14 and 16. The free end portion of the belt tension arm 28 carries a pair of idler rollers 32 and 34 about which the plurality of belts 26 are also trained. As is well known, the belt tension arm 28 maintains the appropriate tension in the plurality of belts 26 during formation of a bale.

The baler is supported on a pair of wheels 36 and 38. Crop material is picked up off the ground by a crop pickup 40. The crop material is introduced into a starting chamber, indicated generally at 42 in FIG. 1a, passing through the "open throat" defined as the distance between the crop pick-up 40 and the starter roll 24. Proper operation of the baler 10 requires that the height of the pick-up mechanism 40 relative to the ground be adjustable between a raised, transport position and a plurality of lower, crop pick-up positions. In prior art balers, the pick-up mechanism 40 was height adjustable relative to the wheels and the main body of the baler. Accordingly, the size of the open throat opening varied with vertical movement of the crop pick-up mechanism relative to the main frame of the baler.

In the present invention, a four-bar wheel lift apparatus, indicated generally at 44 in FIGS. 1–4, is used to adjust the position of the main body of the baler relative to the wheels 36 and 38. The crop pick-up mechanism 40 is fixed to the main body of the baler so that adjustment of the four-bar lift apparatus 44 will adjust the height of the crop pick-up mechanism 40 between a transport position and a plurality of crop pick-up positions, while the size of the open throat opening remains constant.

Referring now to FIG. 2, a lever plate 46 is pivotally interconnected to a vertical frame member 48 of the baler by an upper link 50 and a lower link 52. The elements 46–52 combine to form a four-bar parallelogram linkage. It should be understood that the four-bar lifting apparatus 44 illustrated in FIGS. 2 and 3, are on the right side of the baler 10. Corresponding elements, generally designated using the same reference numerals, are duplicated on the left-hand side of the baler 10, as illustrated in FIGS. 1b and 4. A wheel spindle mounting tube 54 is secured to and extends outwardly from the lever plate 46 and mounts the wheel 36 of the baler 10 (FIG. 1a). A pair of gussets 56 and 58 are secured by weldments or the like between the wheel spindle mounting tube 54 and the lever plate 46 so as to further strengthen the mounting of the spindle mounting tube 54.

Figure 3A:
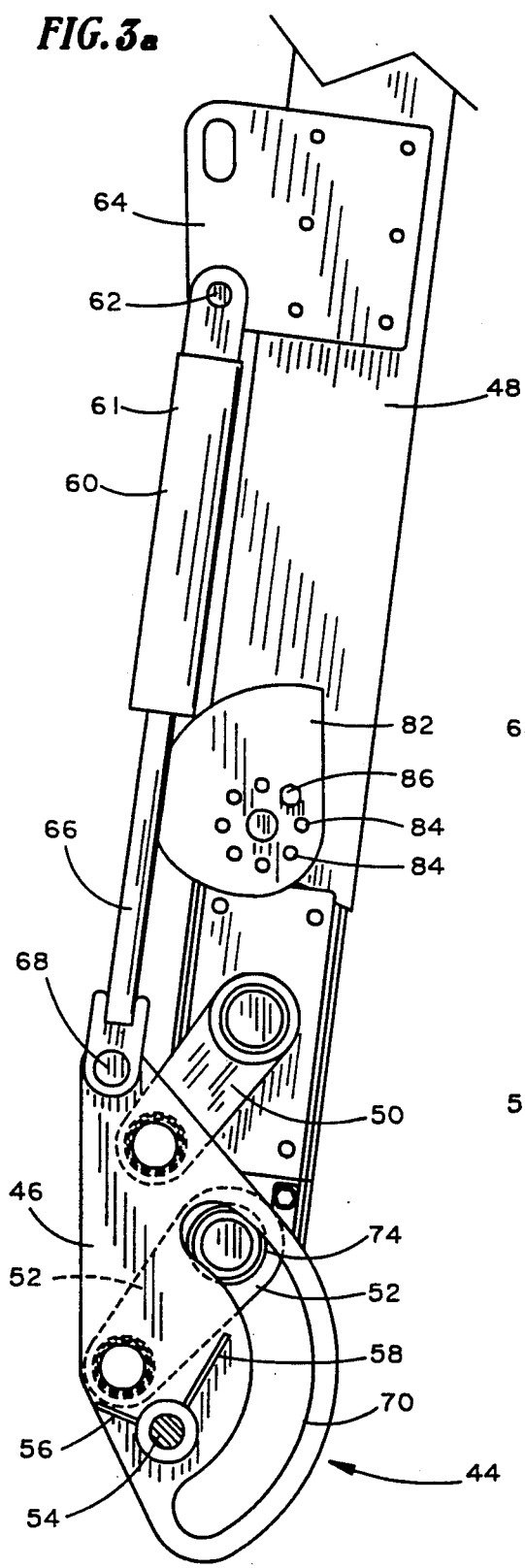
FIGS. 3a and 3b are side elevational views corresponding to FIG. 2 and showing the four-bar linkage at its extreme upper and lower positions, respectively.
Figure 3B:
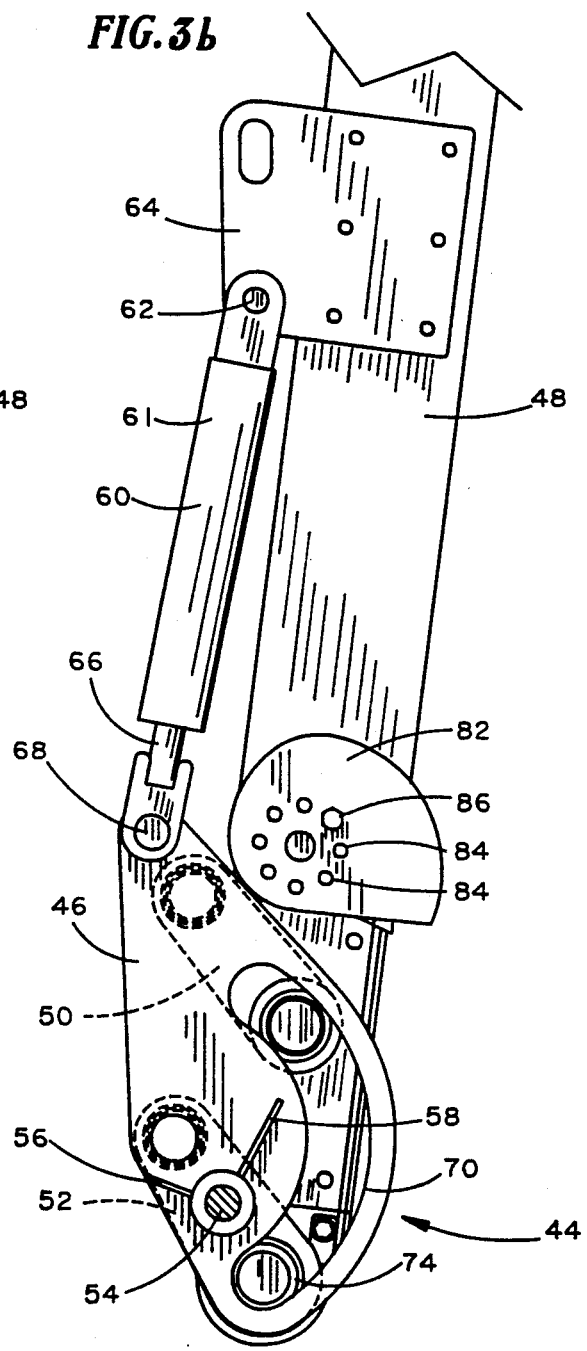

The position of the lever plate 46 relative to the vertical frame member 48 is adjustable by a hydraulic cylinder 60 including a main body 61 that is pivotally attached at 62 to a mounting ear 64 that is secured to the vertical frame member 48. The hydraulic cylinder includes an extensible and retractable piston 66, the proximal end portion of which is pivotally attached at 68 to the lever plate 56. Full extension of the hydraulic cylinder 60 moves the vertical frame member 48 to its extreme upper position as illustrated in FIG. 3a; full retraction of the cylinder 60 moves the vertical frame member 48 to its extreme lower position as illustrated in FIG. 3b.

The lever plate 46 is held by its pivotal interconnection to the vertical frame member 48 by the links 50 and 52. In an application where the load applied to the lever plate 46 is in the plane of the pivot points of the parallelogram linkage, the four-bar linkage as described above would be sufficient to carry the applied load. In the preferred embodiment, however, the wheels 36 and 38 are mounted on the wheel spindle mounting tubes 54 which are extended outwardly from the lever plates 46. The load being borne by the lever plates 46, accordingly, is offset from the plane containing the pivot points. There is, accordingly, a moment induced in the pivot connections of the four-bar linkage.

To accommodate the induced moment, an arcuate channel 70 has been cut into the lever plate 46 in order to receive a pin 72 throughout the range of movement of the lever plate 46. A boss 74 is attached to the pin 72 on the outer side of the lever plate 46. The end of the crank axle 76 creates a bearing surface adjacent the inner surface of the lever plate 46. There is a small degree of clearance between both the boss 74 and the bearing surface of the crank axle 76 and the unloaded lever plate 46. When the wheel spindle tubes 54 are loaded, the clearances in the pivot connections to the upper and lower links 50 and 52 allow the lever plate 46 to deflect until it comes into contact with the boss 74 on the additional pin 72 and or the bearing surface on the crank axle 76. The boss 74 and the bearing surface on the crank axle 76, accordingly, allow the four-bar linkage to withstand loading which is not in the same plane as the pivot connections.

As best illustrated in FIG. 4, a crank axle 76 interconnects the four-bar linkage assemblies 44 on either side of the baler. The crank axle 76 is mounted for pivotal movement inside a pair of axle mounting tubes 78 and 80, one each of which is secured to either of the vertical frame members 48 at opposite sides of the baler. The end portions of the crank axle 76 support the pins 72 which extend through the channel 70 in each of the lever plates 46. The lower links 52 are fixedly secured to the crank axle 76 thereby forming crank arms which will pivot the crank axle 76.

The longitudinal axis of the crank axle 76 thereby forms one of the four pivot points of the parallelogram linkage of the four-bar linkage apparatuses 44. Upon full extension of the hydraulic cylinders 60, as illustrated in FIG. 3a, the main body of the baler 10 is moved away from the wheels 36 and 38 to the transport position illustrated in FIG. 1a. The baler 10 is maintained in the transport position by closure of a valve (not shown) in the hydraulic circuitry for operation of the hydraulic cylinders 60. The closed valve effectively prevents retraction of the cylinder due to trapping of the hydraulic fluid therein. Retraction of the hydraulic cylinders 60 will move the main body of the baler closer to the wheels 36 and 38 thereby lowering the crop pick-up mechanism 40 relative to the ground. The hydraulic cylinders 60 allow continuous adjustment of the relative position of the crop pick-up mechanism 40 to any desired crop pick-up position. Full retraction of the cylinders 60, as illustrated in FIG. 3b, will move the main body of the baler and the crop pick-up mechanism 40 to the extreme lower position, as illustrated in FIG. 1b.

A spiral stop member 82 is mounted for rotation on each of the vertical frame members 48. A plurality of throughbores 84 are provided in the stop member 82 which are alignable with a matching plurality of throughbores in the vertical frame member 48. One or more bolts 86 are inserted into the aligned openings 84 and serve to fix the position of the spiral stop member 82 in any desired one of the plurality of rotated positions. The spiral stop members 82 will, accordingly, serve to define a selected extreme lower position of the crop pick-up mechanism 40 by contact of the lever plates 46 with the spiral stop members 82 (FIG. 2).

Although the invention has been described with respect to a preferred embodiment thereof, it is to be also understood that it is not to be so limited since changes and modifications, such as rotating the lever plate relative to the baler frame by rack and pinion gears or a gear box with a worm gear, can be made therein which are within the full intended scope of this invention as defined by the appended claims.

I claim:
1. A lift apparatus for a ground vehicle, comprising:
 (a) a pair of transversely opposite frame members interconnected by a transversely extended crank axle;
 (b) a pair of lever plates each of which supports a ground wheel;
 (c) a pair of parallelogram linkages, each including one of said lever plates pivotally interconnected to the associated one of said frame members by an upper link arm and a lower link arm, said lower link arms forming crank arms at either end of said crank axle; and

(d) means for pivoting said crank axle relative to said frame members.

2. A lift apparatus as defined in claim 1, wherein said frame members are substantially vertical.

3. A lift apparatus as defined in claim 1, wherein each of said lever plates has an arcuate opening through which extends either one of the end portions of said crank axle such that said axle end portions are moved between an upper end portion and a lower end portion of said arcuate opening upon retraction and extension of said motive means.

4. A lift apparatus as defined in claim 1 wherein said lower link arms are located inside said lever plates.

5. A lift apparatus as defined in claim 1, wherein said wheels are mounted on spindles that are secured to and extend outwardly from said lever plates.

6. A lift apparatus as defined in claim 1, further comprising a pair of stop members, one each of which is mounted on either of said frame members above said upper link arm for movement between a plurality of adjusted positions, and wherein contact between said lever plate and said stop member defines the maximum extent of retraction of said wheels relative to said frame members.

7. A lift apparatus as defined in claim 6, wherein said stop members are of a spiral shape and are mounted for pivotal movement on said frame members.

8. A lift apparatus as defined in claim 1, wherein said motive means is a pair of linear actuators.

9. A lift apparatus as defined in claim 1, wherein said motive means is a pair of hydraulic cylinders.

10. A lift apparatus as defined in claim 9, further comprising a valve for blocking the flow of hydraulic fluid through said hydraulic cylinders to prevent extension or retraction of said cylinders.

11. A lift apparatus as defined in claim 10, wherein said closure of said valve defines a fixed position of said wheels relative to said frame members.

12. A lift apparatus for a baler, comprising:
(a) a pair of transversely opposite vertical frame members interconnected at lower end portions thereof by a transversely extended crank axle;
(b) a pair of radially extended crank arms, one each of which is secured to one of the end portions of said crank axle;
(c) a pair of lever plates, one each of which is pivotally connected by an upper link to an associated one of said vertical frame members and to an associated one of said crank arms;
(d) a pair of wheels one each of which is mounted to either of said lever plates; and
(e) extensible and retractable means interconnecting each of said vertical frame members and the associated one of said lever plates wherein the baler is raised upon extension of said means and is lowered upon retraction of said means.

13. A four-arm lift linkage for a baler, comprising:
(a) a pair of transversely opposite vertical frame members;
(b) a crank axle extended between and pivotally mounted at either end portion thereof to a lower end portion of either of said vertical frame members;
(c) a pair of crank arms one each of which is secured at a first end portion thereof to either end portion of said crank axle;
(d) a pair of link arms one each of which is pivotally mounted to a corresponding one of said vertical frame members;
(e) a pair of lever plates one each of which is mounted for relative pivotal movement to a second end portion of either of said crank arms and either of said link arms;
(f) a pair of linear actuator means one each of which is extended between and pivotally interconnected to a second end portion of an associated one of said link arms and said vertical frame member;
(g) a pair of spindles one each of which is secured to and extends outwardly from either of said lever plates and on each of which is mounted a support wheel for the baler; and
(h) whereby upon extension and retraction of said linear actuator said vertical frame members are raised and lowered, respectively, relative to said wheels.

14. A lift apparatus for a baler, comprising:
(a) a pair of transversely opposite vertical frame members;
(b) a pair of upper link arms one each of which is mounted for pivotal movement at a first end portion thereof to one of said vertical frame members;
(c) a pair of spindle mount lever plates one each of which is mounted for pivotal movement on a second end portion of one of said upper link arms;
(d) a pair of lower link arms one each of which is mounted for pivotal movement at a first end portion thereof to one of said lever plates;
(e) a transversely extended crank axle received for pivotal movement at either end portion thereof in a lower end portion of either of said vertical frame members and either end portion thereof secured to a second end portion of either of said lower link arms;
(f) an arcuate opening in each of said lever plates through which either of said end portions of said crank axle extends;
(g) a pair of spindles one each of which is mounted to and extends outwardly from an associated one of said lever plates on each of which a wheel for supporting the baler is mounted for rotation; and
(h) a pair of extensible and retractable means one each of which is pivotally mounted at one end thereof to an associated one of said vertical frame members and is pivotally mounted at the other end thereof to an associated one of said lever plates whereupon extension of said means raises said vertical frame members relative to said wheels and retraction of said means lowers said vertical frame members relative to said wheels.

* * * * *